United States Patent Office 3,089,752
Patented May 14, 1963

3,089,752
PREPARATION AND RECOVERY OF AMMONIUM BIFLUORIDE
George Clark, Scotch Plains, N.J., assignor to The American Agricultural Chemical Company, New York, N.Y., a corporation of Delaware
No Drawing. Filed Dec. 27, 1960, Ser. No. 78,287
12 Claims. (Cl. 23—88)

This invention relates to ammonium bifluoride. More particularly, this invention relates to the preparation and recovery of ammonium bifluoride.

In accordance with one embodiment, this invention is concerned with the recovery of fluorine values as ammonium bifluoride from fluorine-containing phosphate rock material. More particularly in accordance with this embodiment, this invention is directed to the recovery of fluorine values as ammonium bifluoride from fluorine-containing and silicon-containing, such as silica-containing phosphate rock material wherein the phosphate rock material is acidulated by contact with an acid, such as phosphoric acid or sulfuric acid, with the eventual production of fluosilicic acid. The resulting fluosilicic acid is then treated in accordance with this invention for the production and recovery of ammonium bifluoride.

Ammonium bifluoride can be prepared by heating an aqueous solution of ammonium fluoride, the ammonium fluoride during the heating operation decomposes to yield ammonium bifluoride in accordance with the following chemical equation.

$$2NH_4F \rightleftharpoons NH_4HF_2 + NH_3$$

The aforesaid chemical reaction however does not go to completion with the result that there remains in the aqueous solution undergoing treatment dissolved ammonium fluoride and ammonium bifluoride, see J. Gen. Chem. (U.S.S.R.), vol. 15, No. 9–10, pages 724–727 (1945). The ammonium bifluoride recovered therefrom is, accordingly, contaminated or admixed with ammonium fluoride.

Ammonium bifluoride has also been prepared by reacting gaseous ammonia and gaseous hydrogen fluoride and cooling the resulting reaction admixture below about 50° C. This method of producing ammonium bifluoride, however, is cumbersome and expensive.

Accordingly, it is an object of this invention to provide an improved method for the production of ammonium bifluoride from ammonium fluoride.

Another object of this invention is to provide an improved method for the production and recovery of ammonium bifluoride from an aqueous solution containing ammonium fluoride dissolved therein.

Still another object of this invention is to provide an improved method for the recovery of fluorine-values as ammonium bifluoride from phosphate rock material.

Yet another object of this invention is to provide an improved method for the fractionation of a solid admixture comprising solid ammonium bifluoride and solid hexamethylenetetramine.

How these and other objects of this invention are achieved will become apparent in the light of the accompanying disclosure. In at least one embodiment of the practice of this invention at least one of the foregoing objects will be achieved.

In the practice of this invention a solid admixture comprising ammonium bifluoride and hexamethylenetetramine, such as a solid admixture formed in accordance with one embodiment of the practice of this invention by reacting ammonium fluoride with formaldehyde to form ammonium bifluoride and hexamethylenetetramine in accordance with the chemical equation $$8NH_4F + 6CH_2O \rightarrow (CH_2)_6N_4 + 4NH_4HF_2 + 6H_2O \quad (I)$$

is fractionated by contacting said admixture with a liquid which is a solvent for one of the components of the admixture, such as hexamethylenetetramine, and a non-solvent for another component of the admixture, such as ammonium bifluoride.

More particularly in accordance with this invention, an improved method of preparing ammonium bifluoride from ammonium fluoride is obtained by forming an aqueous solution containing ammonium fluoride and an ammonia complexing agent, such as formaldehyde, and maintaining the resulting solution at a relatively low temperature, not higher than about 100° C., preferably about room temperature, e.g. 5–40° C. to effect reaction between ammonium fluoride and ammonia complexing agent, formaldehyde, therein with the resulting formation of ammonium bifluoride in accordance with the chemical Equation I above. Should the resulting reaction admixture contain the reaction products ammonium bifluoride and hexamethylenetetramine therein in amounts insufficient to cause precipitation of these compounds upon formation, these reaction products can be separated or recovered by evaporating the reaction admixture to dryness, e.g. low temperature vacuum drying, or by reducing the temperature of the aqueous reaction admixture to crystallize or separate these reaction products or by concentrating, e.g. by vacuum distillation, the reaction admixture to crystallize or separate these reaction products therefrom. The resulting precipitated or crystallized reaction products, solid ammonium bifluoride and solid hexamethylenetetramine, can be recovered from the mother liquor by any suitable means, such as by centrifuging, filtration or by decantation.

Following separation and recovery of the reaction products comprising an admixture of solid ammonium bifluoride and solid hexamethylenetetramine the separation of one of the components, such as ammonium bifluoride, from the other of the components, such as hexamethylenetetramine, can be effected by any suitable means. Preferably, in accordance with one aspect of this invention, the solid admixture comprising ammonium bifluoride and hexamethylenetetramine is treated for the separate recovery of ammonium bifluoride and hexamethylenetetramine therefrom by contacting the admixture with a liquid which is a solvent for one of the components, such as hexamethylenetetramine, and a non-solvent with respect to the other of said components, ammonium bifluoride. In the practice of this invention it is preferred to employ a liquid which is a solvent for the non-ammonium bifluoride component, hexamethylenetetramine, and a relative non-solvent with respect to ammonium bifluoride. By contacting the admixture with a liquid which is a solvent for one of the components, the admixture of ammonium bifluoride and hexamethylenetetramine is fractionated and these fractionated components can then be separately recovered.

The liquid contacting operation or solvent extraction operation can be carried out in any suitable apparatus for effecting liquid-solid contact and can be a continuous or intermittent, batch type, operation. The liquid solvent employed may flow concurrently or countercurrently with respect to the solid admixture of ammonium bifluoride and hexamethylenetetramine undergoing solvent fractionation. Desirably, the solvent extraction operation is carried out at a relatively low temperature, similar to the temperature conditions employed during the above-described conversion operation involving the reaction between ammonium fluoride and formaldehyde, preferably at a temperature below about 40° C., such as a temperature in the range 5–30° C., more or less. Desirably, the solid admixture of ammonium bifluoride and hexamethylenetetramine undergoing fractionation by solvent extraction in accordance with this aspect of the invention is substantially free of water or moisture since the presence of water during the solvent extraction operation tends to adversely affect this operation by reducing the selectivity of the solvent for one of the components, such as hexamethylenetetramine, over the other of the components, ammonium bifluoride. In the solvent extraction step for the separation of ammonium bifluoride from hexamethylenetetramine any suitable solvent which exhibits greater solvent power for one of the components, such as hexamethylenetetramine, over the other of these components, ammonium bifluoride, can be employed. The solvent employed must be inert with respect to the components undergoing fractionation, i.e. does not chemically react with any of the components. Desirably, also the solvent employed should be anhydrous and readily separable, as by evaporation under a vacuum or by washing with another suitable inert low boiling point non-solvent liquid from not only the material which remains behind undissolved by the solvent, such as ammonium bifluoride, but also from the component, such as hexamethylenetetramine, dissolved therein so that when the resulting extract solution is concentrated or otherwise treated for the separation of the dissolved component therefrom, the solvent is readily removed.

Any number of solvents exhibiting a greater solubility for one of the components ammonium bifluoride or hexamethylenetetramine over the other of the components are known and are suitable for use in the practice of this invention. For example, solvents suitable for use in the practice of this invention for the separation of ammonium bifluoride from admixture with hexamethylenetetramine and which exhibit a greater solvent power by hexamethylenetetramine than for ammonium bifluoride includes such compounds as methanol, ethanol, isopropanol, amyl alcohol, glycerine, chloroform and the like and mixtures thereof. Generally, oxygenated hydrocarbons, including monohydric and polyhydric aliphatic alcohols, are suitable such as oxygenated hydrocarbons containing only carbon, hydrogen and oxygen atoms and containing from 1 to 8 carbon atoms per molecule, preferably not more than 5 carbon atoms per molecule. Halogenated hydrocarbons, such as chlorinated hydrocarbons containing from 1 to 4 carbon atoms per molecule, including the perfluoro- and perhalohydrocarbons, i.e. compounds containing only carbon and halogen atoms, are also suitable solvents in the practice of this invention.

Following the solvent fractionation step for the separation and recovery of ammonium bifluoride and hexamethylenetetramine employing a solvent which preferentially dissolve hexamethylenetetramine the ammonium bifluoride after drying and/or separation of the solvent therefrom can be recovered and employed directly as product. Ammonium bifluoride is a very useful industrial chemical since it acts as a fluorinating agent in inorganic and organic reactions. For example, ammonium bifluoride is useful in the ceramic or glass industry as an etching agent, in the dairy and brewing industries as a sterilizing agent, in the wood industry as a fungicide, in the textile industry as a stain removing agent and in industry, generally, as a scale remover for use in boilers, automobile radiators and the like.

The recovered hexamethylenetetramine, after removal of the solvent therefrom, is useful per se as a chemical product, such as a nitrogen release agent in fertilizer compositions.

In accordance with one feature of this invention the separated and recovered hexamethylenetetramine is hydrolyzed, such as by contact with sulfuric acid, for conversion to formaldehyde and ammonium sulfate. The formaldehyde can be returned to the process of this invention to contact additional ammonium fluoride for conversion to ammonium bifluoride. The ammonium sulfate can be separately recovered and employed as a fertilizer or as a nitrogen release agent in fertilizer compositions. Also, if desired and economical, ammonium sulfate can be reacted with sodium hydroxide for the formation of ammonia which, in turn, may be employed to ammoniate aqueous fluosilicic acid solution recovered from a fertilizer treating operation for the preparation of ammonium fluoride.

The following examples are illustrative of the practices of this invention:

Example No. 1

An aqueous solution prepared by admixing 50 grams of ammonium fluoride and 86 grams of 36.7% by weight aqeous formaldehyde solution was maintained at about room temperature, about 25° C. Upon admixing and dissolution of the ammonium fluoride in the aqueous formaldehydehyde solution, a chemical reaction took place with the resulting formation, as indicated in the above Equation I, of ammonium bifluoride and hexamethylenetetramine. An admixture of crystals of ammonium bifluoride and hexamethylenetetramine was separated from the resulting aqueous reaction mixture by vacuum concentration carried out at about 25° C. Thereupon, the resulting admixture of crystals of ammonium bifluoride and hexamethylenetetramine was separated from the remaining mother liquor by vacuum filtration and the separated crystals freed of moisture, such as by drying in an oven at not over 100° C. Ten grams of the crystal admixture were solvent extracted at about room temperature with 25 ml. of isopropanol and the remaining undissolved crystals separated by filtration. The separated crystals were then dried in an oven at about 100° C. for removal of the solvent isopropanol therefrom. The resulting dried, recovered crystals analyzed 99.5% ammonium bifluoride. The hexamethylenetetramine in the resulting solvent extract was recovered by vacuum crystallization.

Example No. 2

An aqueous solution was prepared by adding 50 grams of ammonium fluoride to 86 grams of 36.7% by weight aqueous formaldehyde solution so as to effect chemical reaction between these reactants with the formation of ammonium bifluoride and hexamethylenetetramine. The resulting aqueous reaction mixture was transferred to a platinum evaporating dish and boiled until crystals of ammonium bifluoride and hexamethylenetetramine were obtained. The resulting admixture was then permitted to cool to crystallize additional ammonium bifluoride and hexamethylenetetramine therefrom. The thus-produced crystals were separated from the mother liquor by vacuum filtration and the separated crystals dried to remove the water therefrom. The dried crystals were then extracted with 100 ml. of methanol to dissolve away the hexamethylenetetramine and the residual, undissolved crystals placed in an oven maintained at about 100° C. to remove the solvent methanol therefrom. The resulting methanol free crystals analyzed about 100% ammonium bifluoride. The methanol extract containing hexamethylenetetramine dissolved therein was concentrated and hexamethylenetetramine recovered by crystallization.

Example No. 3

In the recovery of fluorine values as ammonium bifluoride from fluorine-containing, silica-containing phosphate rock material in accordance with the practice of this invention, phosphate rock material after grinding to a suitable mesh size is treated with a mineral acid such as concentrated sulfuric acid. During this operation the fluorine-containing constituent of the phosphate rock material when present as fluorine combined with calcium, e.g. $CaF_2$, reacts with acid to form hydrofluoric acid HF. The resulting formed hydrofluoric acid reacts with a suitable silica-containing constituent of the phosphate rock material to form silicon fluoride $SiF_4$. An admixture of these volatile materials HF and $SiF_4$ is removed from the acid treating operation and recovered in a water washing operation. Upon contact with water, HF and $SiF_4$ react to form fluosilicic acid $H_2SiF_6$, such as an aqueous solution containing about 10% fluosilicic acid.

The resulting formed fluosilicic acid is then ammoniated or reacted with ammonia in accordance with the following chemical equation $$6NH_3 + H_2SiF_6 + 2H_2O \rightarrow 6NH_4F + SiO_2 \quad \text{(II)}$$

The above-described ammoniation operation is preferably carried out in two stages. In the first stage, 2 mols of ammonia are reacted with 1 mol of fluosilicic acid to yield ammonium fluosilicate $(NH_4)_2SiF_6$. This first stage operation is usually carried out in tanks with agitation and the ammonia is added either in gaseous form or as aqueous ammonium hydroxide solution. At this point the reaction admixture has a pH of about 5–6. Since the above-described ammoniation reaction is exothermic, the temperature of the reaction admixture increases to about 60–90° C. Since continued ammoniation at this temperature would not yield a complete reaction and would tend to involve loss of ammonia, the partially ammoniated reaction admixture is transferred to another tank and cooled to about 40° C. Additional ammonia is then added and the resulting reaction admixture during this second stage operation is maintained at about 40° C.

In the second stage operation, 4 mols of ammonia are incorporated in the reaction admixture per mol of ammonium fluosilicate in accordance with the chemical equation $$4NH_3 + (NH_4)_2SiF_6 \xrightarrow{H_2O} 6NH_4F + SiO_2 \quad \text{(III)}$$

Upon completion of the second stage ammoniation reaction the resulting reaction admixture has a pH of about 9.1. During the ammoniation reaction the silica precipitates quantitatively and is removed by filtration.

The resulting aqueous ammonium fluoride-containing solution is then concentrated, preferably below about 40° C., to avoid partial conversion of ammonium fluoride to ammonium bifluoride. Cooling and vacuum concentration at about 0° C. is suitable for effecting the concentration of the ammonium fluoride solution without the formation of undue amounts of ammonium bifluoride. If desired, however, the ammonium fluoride-containing solution after separation of the silica therefrom and either free of ammonium bifluoride or containing a substantial amount of ammonium bifluoride therein can be employed directly in the practice of this invention for reaction with formaldehyde to produce ammonium bifluoride and hexamethylenetetramine.

In the practice of this invention aqueous ammonium fluoride solutions containing as low as 5–10% by weight ammonium fluoride may be employed. As indicated hereinabove the presence of ammonium bifluoride in the ammonium fluoride-containing solution does not adversely affect the practice of this invention since ammonium bifluoride is a desired product. Thereupon, there is added to the relatively cool, concentrated, preferably above about 10% by weight, aqueous ammonium fluoride solution, at least a stoichiometric amount of formaldehyde to react with the ammonium fluoride therein to yield ammonium bifluoride and hexamethylenetetramine. Desirably, the reaction between ammonium fluoride and formaldehyde is carried out at a temperature below 100° C., such as a temperature in the range 0–40° C., more or less.

Following the conversion of ammonium fluoride to ammonium bifluoride, the resulting reaction mixture is concentrated, preferably at a temperature below about 40° C., to precipitate therefrom an admixture of solid ammonium bifluoride and hexamethylenetetramine.

The resulting solid admixture of ammonium bifluoride and hexamethylenetetramine is recovered from the mother liquor by filtration and then dried for the removal of water therefrom. The resulting dried admixture of ammonium bifluoride and hexamethylenetetramine is then solvent extracted with a suitable solvent for one of the components, preferably hexamethylenetetramine, such as by contact with an alcohol, such as methanol. As a result of the solvent extraction operation employing methanol as a solvent, there is recovered undissolved ammonium bifluoride crystals assaying substantially 100% ammonium bifluoride after removal of the solvent methanol therefrom. The resulting methanol extract solution is concentrated for the separation of crystals of hexamethylenetetramine therefrom. The crystallized hexamethylenetetramine is then recovered by filtration and dried and recovered as product.

Although considerable emphasis has been placed in this disclosure of the use of formaldehyde as the ammonia complexing agent for reaction with ammonium fluoride in preparation of ammonium bifluoride therefrom, materials other than formaldehyde are also useful. Generally, those materials or compounds which undergo ammonolysis are useful in the practice of this invention for the conversion of ammonium fluoride to ammonium bifluoride. Suitable such compounds include acetaldehyde and acrylonitrile which yield in the ammonium fluoride to ammonium bifluoride conversion reaction the trimer of 1-aminoethanol $(CH_3CHOHNH_2)_3$ and the corresponding acrylonitrile derivative $HN(CH_2CH_2CN)_2$, respectively. These compounds like hexamethylenetetramine are also readily separable from the ammonium bifluoride by solvent extraction in accordance with this aspect of the invention. For example, the trimer $(CH_3CHOHNH_2)_3$ is soluble in water and the lower aliphatic alcohols such as ethanol and insoluble in ethylether, benzene and carbon disulfide and others. Like hexamethylenetetramine, this material is useful per se, such as a nitrogen release agent in fertilizer compositions, and as a rubber accelerator.

As will be apparent to those skilled in the art in the light of the foregoing disclosure many modifications, changes and substitutions are possible in the practice of this invention without departing from the spirit or scope thereof.

I claim:

1. A method which comprises ammoniating an aqueous fluosilicic acid solution for the production of ammonium fluoride therefrom in accordance with the chemical equation $$6NH_3 + H_2SiF_6 + 2H_2O \rightarrow 6NH_4F + SiO_2$$

recovering an aqueous solution containing ammonium fluoride dissolved therein, incorporating in said aqueous solution formaldehyde and maintaining the resulting solution, now containing ammonium fluoride and formaldehyde therein, at a temperature not higher than about 100° C. to produce an admixture of solid hexamethylenetetramine and solid ammonium bifluoride in accordance with a reaction set forth in the following chemical equation $$8NH_4F + 6CH_2O \rightarrow (CH_2)_6N_4 + 4NH_4HF_2 + 6H_2O$$

separating the resulting admixture comprising hexamethylenetetramine and ammonium bifluoride, contacting the resulting separated admixture with a liquid which is a solvent for hexamethylenetetramine and a non-solvent for ammonium bifluoride and separating the resulting liquid extract and the resulting undissolved solid ammonium bifluoride.

2. In an operation wherein fluorine-containing and silicon-containing phosphate rock material is acid treated with the resultant production of an aqueous fluosilicic acid solution and said fluosilicic acid solution treated for the recovery of fluorine values therefrom, the improvement which comprises treating said fluosilicic acid solution with ammonia for the production of ammonium fluoride in accordance with the chemical equation $$6NH_3 + H_2SiF_6 + 2H_2O \rightarrow 6NH_4F + SiO_2$$

reacting the resulting produced ammonium fluoride in the form of an aqueous solution thereof with formaldehyde in accordance with the following chemical equation $$8NH_4F + 6CH_2O \rightarrow (CH_2)_6N_4 + 4NH_4HF_2 + 6H_2O$$

the aforesaid reaction being carried out in said aqueous solution at a temperature not higher than about 100° C., producing from the resulting reaction mixture an admixture of solid ammonium bifluoride and solid hexamethylenetetramine, contacting the resulting admixture with a liquid, said liquid being solvent for hexamethylenetetramine and a non-solvent for ammonium bifluoride, to yield a resulting solution of hexamethylenetetramine and recovering the undissolved ammonium bifluoride as product.

3. A method in accordance with claim 2 wherein the resulting solution of hexamethylenetetramine is treated for the recovery of hexamethylenetetramine therefrom.

4. A method in accordance with claim 2 wherein fluorine is contained in said phosphate rock material chemically combined with calcium.

5. A method in accordance with claim 2 wherein said phosphate rock material is acid treated by contact with sulfuric acid.

6. A method in accordance with claim 2 wherein said phosphate rock material is acid treated by contact with phosphoric acid.

7. A method in accordance with claim 2 wherein said liquid is an aliphatic alcohol containing from 1 to 8 carbon atoms per molecule.

8. A method for the manufacture of ammonium bifluoride from ammonium fluoride which comprises reacting an aqueous solution of ammonium fluoride with formaldehyde at a temperature not higher than about 100° C. to convert substantially all of the ammonium fluoride to ammonium bifluoride in accordance with the chemical equation $$8NH_4F + 6CH_2O \rightarrow (CH_2)_6N_4 + 4NH_4HF_2 + 6H_2O$$

with the resulting formation of an admixture comprising solid ammonium bifluoride and solid hexamethylenetetramine, subjecting the resulting admixture to contact with a solvent to dissolve preferentially said hexamethylenetetramine and recovering the remaining undissolved ammonium bifluoride.

9. A method for the manufacture of ammonium bifluoride which comprises reacting ammonium fluoride dissolved in an aqueous solution with an organic ammonia complexing agent selected from the group consisting of formaldehyde, acetaldehyde and acrylonitrile at a temperature not higher than about 100° C. to yield ammonium bifluoride as a product of the reaction.

10. A method in accordance with claim 9 wherein said ammonia complexing agent is formaldehyde.

11. A method in accordance with 9 wherein said ammonia complexing agent is acetaldehyde.

12. A method in accordance with claim 9 wherein said ammonia complexing agent is acrylonitrile.

References Cited in the file of this patent
UNITED STATES PATENTS

| | | |
|---|---|---|
| 1,642,788 | Proctor | Sept. 20, 1927 |
| 2,288,727 | Mayer | July 7, 1942 |
| 2,816,818 | Gross | Dec. 17, 1957 |
| 2,945,745 | Reeve | July 19, 1960 |
| 3,021,194 | Cunningham | Feb. 13, 1962 |

FOREIGN PATENTS

| | | |
|---|---|---|
| 286,730 | Great Britain | July 5, 1928 |

OTHER REFERENCES

Seidell: "Solubilities of Inorganic and Organic Compounds," vol. 1, page 310 (1919), Van Nostrand Co., N.Y.